Jan. 19, 1965   J. W. GOOTHERTS   3,166,683
SCANNING BIMORPH TRANSDUCER
Filed May 1, 1961
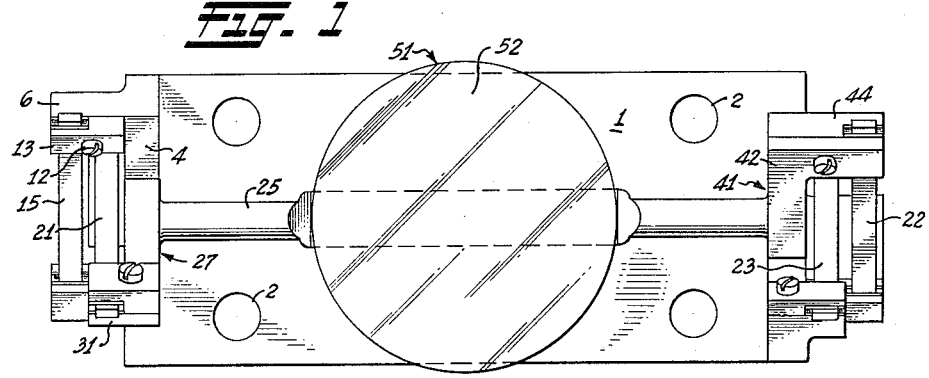
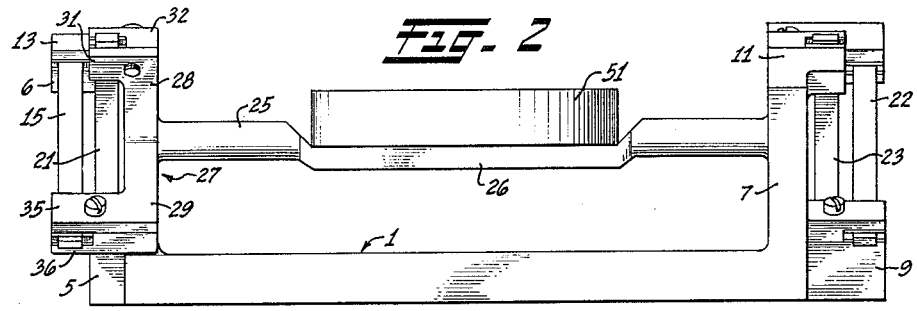
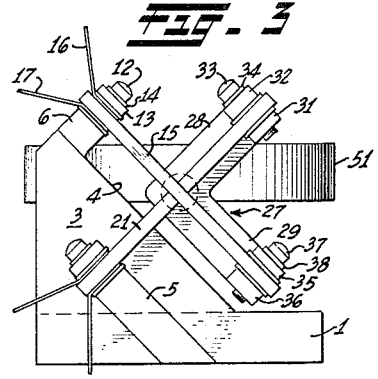
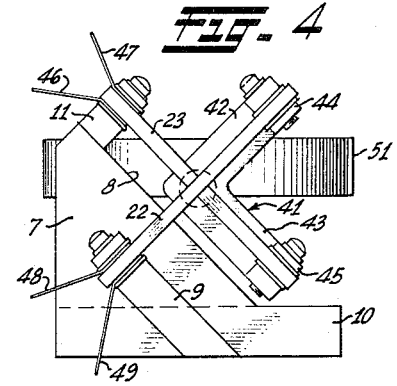
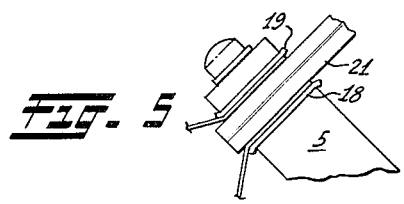
INVENTOR:—
JEROME W. GOOTHERTS
BY
ATTORNEYS 3,166,683
SCANNING BIMORPH TRANSDUCER
Jerome W. Gootherts, Redwood City, Calif., assignor to American Radiator & Standard Sanitary Corporation, New York, N.Y., a corporation of Delaware
Filed May 1, 1961, Ser. No. 106,941
6 Claims. (Cl. 310—8.6)

This invention relates to and in general has for its object the provision of a transducer including a rotor supported at each of its ends from the free end of a bimorph reed arranged to rotate about the flexure point of the reed.

As is well known in the art, a bimorph reed consists of a pair of piezoelectric elements bonded together and which, when subjected to a potential difference, will bend in somewhat the same fashion as a bimetal element when subjected to a difference in temperature. Also well known in the art is the fact that if a bimorph is anchored at one end cantileverwise and then its piezoelectric elements subjected to a potential difference, its outer end will rotate in a circular arc about a predetermined flexure point intermediate its ends provided that it is not subjected to an acceleration. In the latter event, and depending upon the direction of acceleration, the free end of the bimorph reed may be subjected to two independent forces, one resulting from the acceleration and the other resulting from the potential difference to which the reed elements may be subjected. This would, of course, result in an erroneous read-out of the instrument.

Another well-known characteristic of bimorphs is that if a bimorph be placed under a strain, a potential difference across its piezoelectric elements will result, this of course being the reverse of the piezoelectric effect.

More specifically, one of the objects of this invention is the provision of a transducer of the character above described, wherein each end of its rotor is supported by a pair of crossed bimorph reeds and where the free ends of one pair of reeds face oppositely to the free ends of the other pair of reeds so that any force to which one reed is subjected due to acceleration is opposed by the force to which its companion reed is subjected due to such acceleration.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Referring to the drawings:

FIG. 1 is a plan view of a transducer embodying the objects of my invention.

FIG. 2 is a front elevation of the transducer shown in FIG. 1.

FIG. 3 is a left end elevation of said transducer.

FIG. 4 is a right end elevation of said transducer, and

FIG. 5 is an enlarged fragmentary detail of one of the bimorph mountings.

More specifically, the transducer illustrated in these various figures includes a generally rectangular base 1 provided with a plurality of mounting holes 2. Formed on the left end of the base 1 is an end flange or wall 3 of triangular configuration including an upwardly and forwardly directed 45° face 4. Extending endwise from the wall 3 and formed integral therewith is a diagonal reed mounting 5 paralleling the face 4. Formed integral with the wall and extending endwise from its upper corner is a reed mounting 6 protruding beyond the reed mounting 5.

Similarly, the right end of the base 1 is provided with an upstanding wall 7 of triangular configuration, but in this case its diagonal wall 8 faces upwardly and rearwardly instead of upwardly and forwardly as does the face 4 of the wall 3. Otherwise expressed, the wall faces 4 and 8 are 90° apart. Extending endwise from the wall 7 and formed integrally therewith is an outer diagonal reed mounting 9. Extending endwise from the upper corner of the wall 7 is an inner, endwise-extending reed mounting 11.

Secured to the outer mounting 6 of the left end of the transducer by a screw 12, undercut clip 13 and lock washer 14 is an outer bender-type bimorph reed 15 paralleling the wall 3 and normally paralleling the diagonal wall face 4. Clamped by the screw 12 over the faces of the bimorph reed 15 are electric leads 16 and 17. If the two piezoelectric elements of the bimorph reed 15 are to be connected in series, they should of course be insulated as at 18 and 19 (see FIG. 5) from their mounting, and therefore from each other. If on the other hand the piezoelectric elements are to be connected in parallel, no such insulation is required, for the reed mounting will then of itself serve to connect the two piezoelectric elements.

Similarly secured to the reed mounting 5 between the outer reed 15 and the wall 3 and having substantial clearance therewith is an inner bender-type bimorph reed 21 disposed at an angle of 90° relative to the inner bimorph reed 15. The two bimorph reeds 15 and 21 should be of identical construction, size and characteristics, and from FIG. 3 it will be noted that both of them are supported from their rear ends cantileverwise. This structure therefore constitutes a flexure pivot for each bimorph reed.

Similarly mounted to the reed mountings 9 and 11 on the right end of the transducer are outer and inner bimorph reeds 22 and 23 but here the reed mountings 9 and 11 are on the front side of the transducer so that the free ends of the bimorph reeds extend rearwardly rather than forwardly.

Extending between the left and right end sets of bimorph reeds is a shaft 25 provided with a depressed central section 26. Provided on the left end of the shaft 25 is a forwardly-facing V-shaped bracket 27 subtending an angle of 90° and including an upper arm 28 and a lower arm 29 respectively paralleling the bimorph reeds 21 and 15 when the latter are in their neutral and passive conditions. Formed on the forward upper end of the upper arm 28 is a reed mounting 31 underlying and arranged to receive the free end of the inner bimorph reed 21. Disposed over the end of the bimorph reed 21 is an undercut clip 32, and securing the clip and the end of the reed 21 rigidly to the mounting 31 either directly or through insulating washers is a screw 33 and lock washer 34.

Similarly, the lower bracket arm 29 is provided with a reed mounting 35 overlying and arranged to receive the free end of the outer bimorph reed 15. Disposed over the lower face of the free end of the reed 15 is an undercut clip 36, and locking this structure rigidly together is a screw 37 and lock washer 38. Here again the reed 15 can be insulated from its supporting structure by insulating washers, depending upon whether the piezoelectric elements of the reed are to be connected in parallel or in series.

Here it should be noted that the axis of the shaft 25 is coincident with the line of intersection of the two longitudinally-extending planes respectively containing the bimorph reeds 15 and 21, and that the shaft axis bisects the bimorph reeds. In short, the reeds 15 and 21 are symmetrically arranged.

The right end of the shaft terminates in a rearwardly-facing V-shaped bracket 41 which, like the left end bracket 27, is provided with an upper arm 42 and a lower arm 43.

The upper arm 42 is formed with a reed mounting 44 and the lower arm 43 with a reed mounting 45. The upper free end of the reed 22 is rigidly secured to the reed mounting 44 by a clip and screw arrangement identical to the arrangement used in fastening the free ends of the left-hand bimorph reeds 15 and 21 to their mountings 31 and 35, and the free end of the right-hand bimorph reed 43 is similarly secured to its mounting 45. Here again the axis of the shaft 25 is coincident with the two right angularly disposed planes containing the reeds 22 and 23 and also the reeds 15 and 21, and the shaft axis likewise bisects the reeds 22 and 23 as it does the left-hand reeds 15 and 21. The only essential difference between the left and right ends of the transducer is that on its left-hand end the bimorph reeds 15 and 21 are supported from their rear ends, whereas on the right-hand side the reeds 22 and 23 are supported from their forward ends. In both cases, however, each reed support is of the flexure pivot support type.

Secured to the opposed piezoelectric elements of the bimorph reed 23 are electric leads 46 and 47, and similarly connected to the opposed elements of the bimorph reed 22 are electric leads 48 and 49.

Mounted on the depressed section 26 of the shaft 25 is a mirror 51, the reflecting surface 52 of which preferably contains the axis of the shaft 25.

As a result of this structure, each bimorph reed of each pair of bimorphs, in response to a potential difference imposed on its piezoelectric elements, will deform into a circular arc, the central point of which will always lie on the axis of the shaft 25. Otherwise expressed, the free end of each bimorph reed rotates in a small circular arc about the axis of the shaft 25. It is to be here understood that the mirror 51 is merely one example of an indicator which can be actuated by the shaft 25 and that for ready reference the mirror, shaft and shaft brackets can be considered as a rotor.

Although the base 1 and its side walls 3 and 7 can be made of any desired material, the rotor assembly should be made of a light material such as aluminum, and the weight of the mirror 51 should be kept as low as possible, thereby to keep the inertia of the rotor to a minimum.

The statement above made that the outer end of each of the bimorph reeds is constrained to rotate about the flexure point of the reed is true only so long as the transducer is not undergoing any substantial acceleration. If the transducer is undergoing acceleration, the rotor, due to its inertia and because of its flexure coupling with the transducer base, may tend to move relative to its base. It is to obviate any such relative extraneous movement of the rotor that the bimorph reeds of each pair of reeds are crossed and that the free ends of one pair of reeds extend in one direction whereas the free ends of the other pair of reeds extend in the opposite direction. By resorting to this expedient any tendency of the rotor to rotate independently of its base due to accelerating forces is canceled out, as will be readily appreciated from a consideration of FIGS. 3 and 4. Any such extraneous rotation is, of course, undesirable, for it would result in an inaccurate read-out of the instrument.

As is, of course, well known in the art, all four reeds can be used to drive the rotor. Three reeds can be used to drive the rotor, and the remaining one used as a position transducer. In this case, of course, the latter reed is bent by the rotation of the rotor and thereby generates a potential difference across its piezoelectric elements. One reed can be used to drive the rotor and another used as a position transducer, and in this case the two remaining reeds are merely passive.

Obviously the mirror 51 can be replaced by a pointer or by a stylus.

I claim:

1. A transducer comprising a base; two spaced bimorph reeds mounted on said base cantileverwise for flexure in parallel planes; a rotor disposed between said reeds and having an axis of rotation perpendicular to said reeds and passing through the flexure points of said reeds; and means for supporting the ends of said rotor from the free ends of said bimorph reeds.

2. A transducer of the character set forth in claim 1 wherein said bimorph reeds are identical.

3. A transducer comprising a base; a first pair of crossed, laterally offset bimorph reeds mounted on said base; a second pair of crossed, laterally offset bimorph reeds mounted on said base in spaced relation to said first pair of bimorph reeds, the flexure points of each of said reeds being located on a common axis; a rotor disposed between said first and second pairs of reeds with its axis coincident with said common axis and means for supporting the ends of said axis from the free ends of said bimorph reeds.

4. A transducer of the character set forth in claim 3 wherein the free ends of one pair of bimorph reeds extend in a direction opposite to the free ends of the other pair of bimorph reeds.

5. A transducer comprising a base; two spaced bimorph reeds mounted on said base cantileverwise for flexure in parallel planes, the angle between one of said reeds and said base differing from the angle between the other of said reeds and said base by 90°; a rotor disposed between said reeds and having an axis passing through the flexure points of said reeds; and means for supporting the ends of said rotor from the free ends of said bimorph reeds.

6. A transducer comprising a base; a bimorph reed mounted on said base cantileverwise for flexure in a plane; a rotor having an end thereof disposed adjacent said reed, said rotor having an axis of rotation perpendicular to said plane of reed flexure and passing through the flexure point of said reed; and means for supporting said rotor end in fixed relation to the free end of said reed.

References Cited in the file of this patent
UNITED STATES PATENTS
2,227,268    Mason _____ Dec. 31, 1940